June 11, 1940.                    D. D. COOKE                    2,203,894
MARKING OF AIRCRAFT LANDING AREAS
Filed May 31, 1938                                2 Sheets-Sheet 1
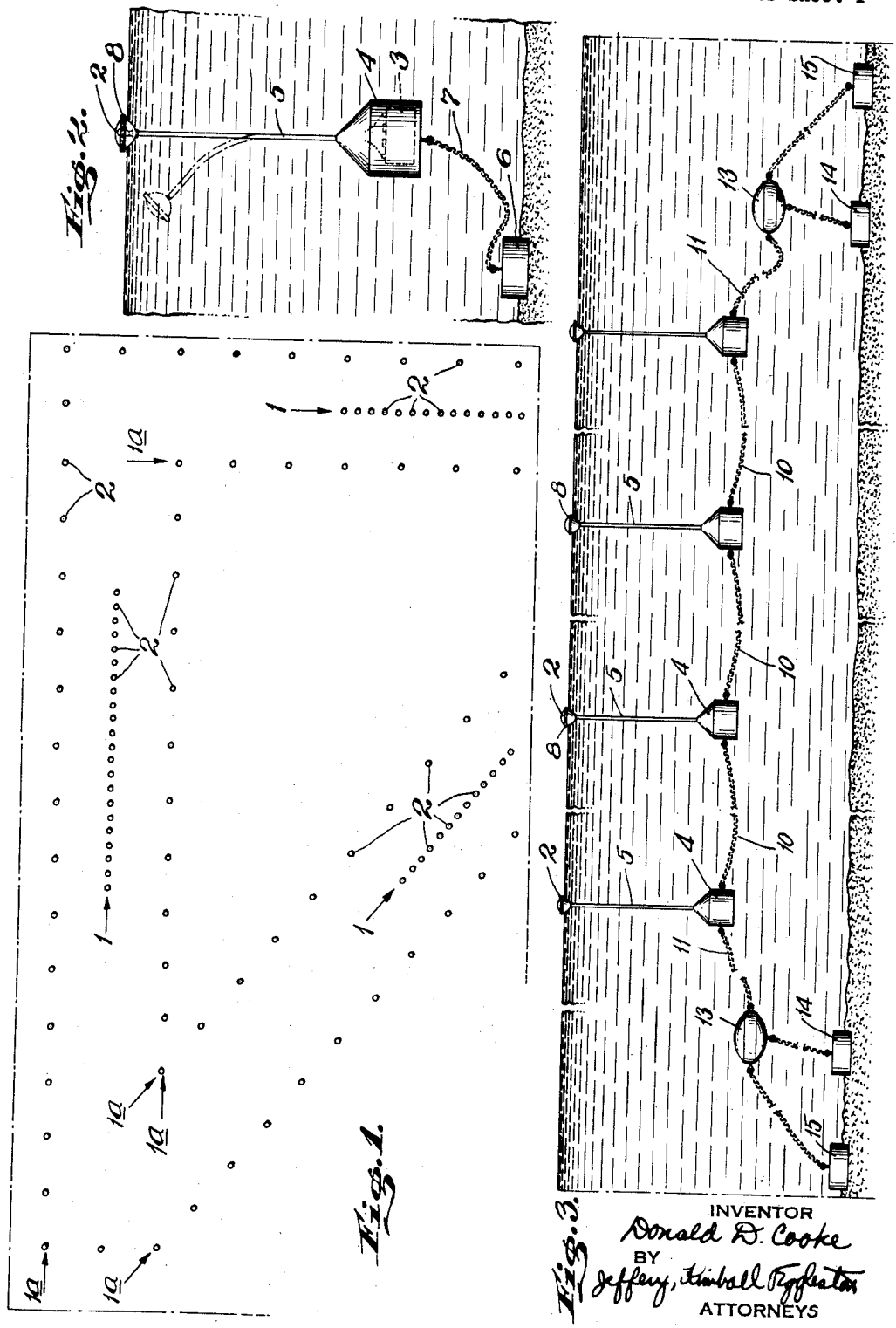
INVENTOR
Donald D. Cooke
BY
Jeffery, Kimball & Eggleston
ATTORNEYS

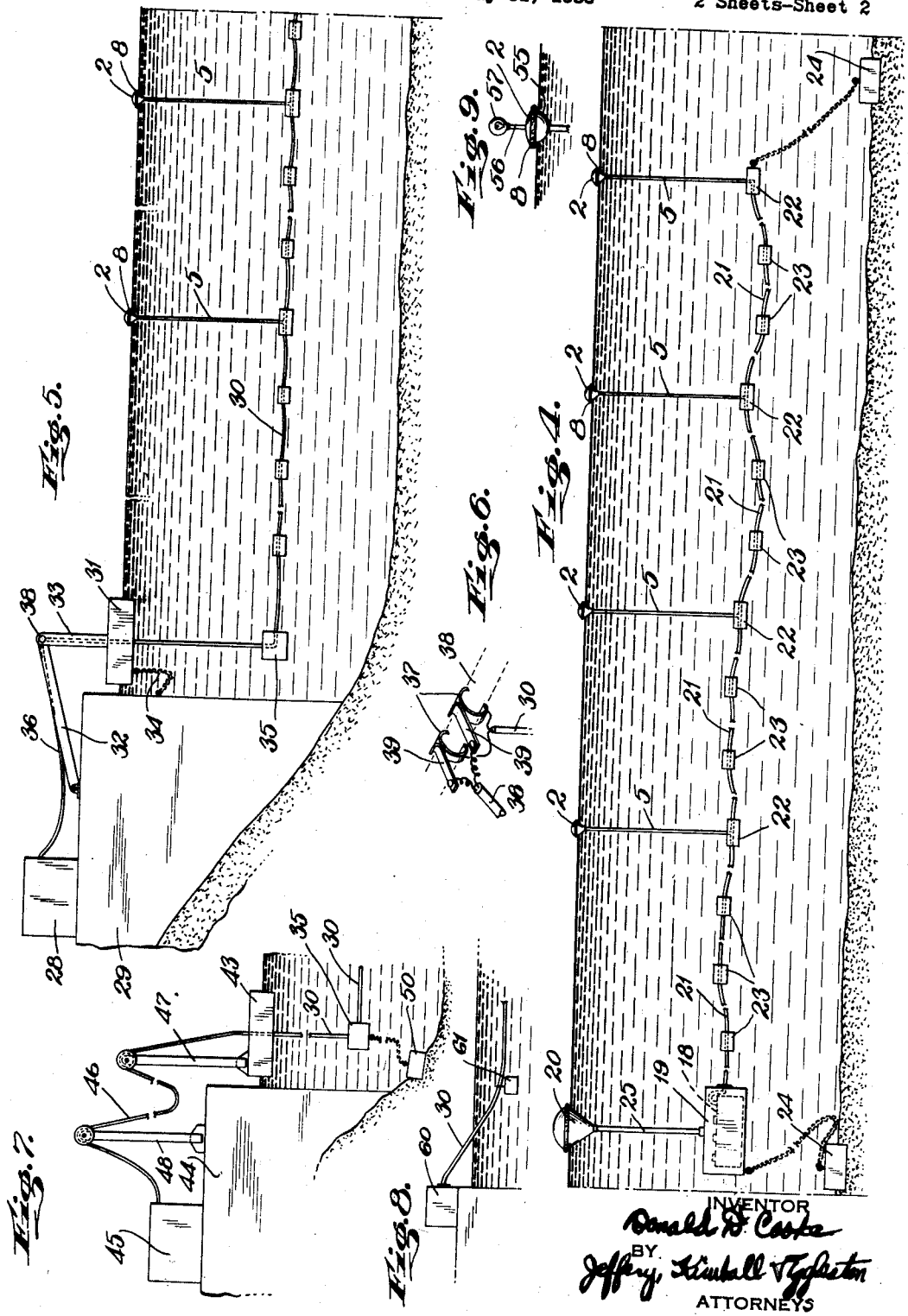

Patented June 11, 1940

2,203,894

UNITED STATES PATENT OFFICE 2,203,894

MARKING OF AIRCRAFT LANDING AREAS

Donald D. Cooke, New York, N. Y.

Application May 31, 1938, Serial No. 210,924

6 Claims. (Cl. 177—352)

My invention relates to the marking of aircraft landing areas on water. It may serve, primarily, to mark the surface of the water for the pilot of an aircraft descending at night, so that he may judge his altitude above the water at every instant as he glides to a landing. Also it may serve to indicate the confines of usable water areas to a pilot alighting, taking off or taxiing. While directed especially to illuminated markers adapted for night use, it will be apparent that the same markers can be used for daylight flights as well, whether illuminated or otherwise at such times.

As is well known, aircraft landing areas on land are marked by fixed ground lights. Fixed lights are unsuited for directing aircraft operations on water however, because such a light would be likely to damage seriously the hull or pontoon of any landing aircraft that might strike it. Likewise, floating buoys, like those used for marking channels and reefs for ships and boats, are unsuited for the same purposes for the same reason.

According to my invention, each lighted marker is floated at or near the water surface where it is easily visible. Likewise the source of supply for the light, or at least so much of the source as is immediately adjacent the marker, is floated also. As a result of floating both the marker and its immediate source of lighting energy, the marker rises and falls with the waves and tides and thus substantially maintains its desired position at the water surface, and furthermore does this without, for example, the repeated rising and falling of the marker flexing and abrading against the sea, lake or river bottom any cable, connector or other conductor that may be used to supply lighting energy to the marker. Further, the connection between each floating marker and the adjacent or immediate source of energy that illuminates it is made as flexible as convenient, and at least so much of the source of energy as is adjacent the floating marker is suspended so far below the water surface as to be beyond the range or draft of a descending aircraft hull or pontoon. As a result of this relation of the parts, the marker itself at the surface of the water can be of substantially little weight and is displaced readily when struck, so that an aircraft hull or pontoon striking the marker accidentally either thrusts it aside or submerges and passes over it without damage, and also passes over the heavier source of lighting energy without damage since this is below the reach of the aircraft. This source of lighting energy may be placed below the draft also of boats likely to cruise the area, in which case the marker or a system of such markers is not readily subject to damage or displacement by surface craft, since the marker or markers respond ordinarily in the same way when struck by surface craft as when struck by a descending aircraft.

My invention may assume various forms, some of which are illustrated in the accompanying drawings. I contemplate that the lighting energy will be electricity usually, but gas or liquid illuminants may be used.

In the accompanying drawings which illustrate diagrammatically various forms that my invention may assume: Fig. 1 is a plan view of a part of one possible arrangement (and also a representative arrangement) of markers of my invention at the surface of the water. Fig. 2, in elevation, illustrates one form which such an illuminated marker may assume, an individual primary source of energy forming a part of the unit in this instance. Fig. 3 illustrates in elevation a possible mode of assembling and anchoring a number of such markers as that shown in Fig. 2. Fig. 4 illustrates in elevation an assembly of markers of my invention in which a single primary source of illuminating energy serves all the markers of the assembly, this source being floated also in this instance. Fig. 5 illustrates in elevation an assembly of such markers having a common primary source of illuminating energy located on the shore, a pier or other fixed structure. Fig. 6 is a detail of construction of Fig. 5. Figs. 7 and 8 illustrate in elevation arrangements generally like that of Fig. 5, but are intended to show principally other arrangements for making connections to primary sources of energy supply located in fixed positions. Fig. 9 illustrates another form the marker at the water surface may assume.

A representative, and for some situations a convenient, arrangement of the markers at the water surface is shown in part in Fig. 1. As there indicated rows 1 of markers 2 at the surface of the water may serve to guide a pilot in making his landing, the pilot directing his craft along one side of the row he uses. Outer rows 1a of similar lights may be employed to outline the whole area or areas usable for landing or taking off. I contemplate that markers 2 directly at the water surface, as shown in Fig. 2, are more suitable for guiding markers or rows of markers such as 1, while markers with their lights placed somewhat above the water surface as suggested in Fig. 9 may be advisable for outlining available areas as at 1a in this Fig. 1. These matters are mainly matters of choice however, as is the arrangement of disposition of the markers on the water, it being understood that either guiding rows 1 may be used alone, or outlining rows 1a may be used alone, or both may be used as shown in Fig. 1; or still other arrangements and dispositions may be employed as best may suit a particular situation, and even a single marker alone may be sufficient or satisfactory in some instances. It is to be understood too that this Fig. 1 is not intended to indicate the sizes of the individual markers nor their numbers relative to the lengths of the rows or the widths of the available landing areas, although I contemplate that it may be advisable usually to place the markers closer together in guiding rows such as 1 than in outlining rows such as 1a; this again however is, generally, a matter of good designing and engineering.

In the form of the invention shown in Fig. 2, a conventional (or any desired form of) incandescent electric lamp is enclosed within a sufficiently watertight container 2, these two forming the marker at the water surface. While the glass of the lamp itself may serve the purposes of the container 2, I contemplate that a separate container will be desired usually to provide this part of the device with the needed buoyancy as appears hereafter. At least the upper portion of this container 2 is transparent or translucent to permit the emission of the light. If desired, a reflector may be used, either inside or outside the container, to direct the light, and especially direct it outwardly through the upper portion of the container; such a reflector may be provided by "silvering" the exterior or the interior of the container below the lamp, and such may be considered to be the construction here. The primary source of current for the lamp in this instance is a storage battery 3, which is carried within a watertight container 4. The conductors carrying the current between the battery 3 and the lamp of the marker 2, are indicated at 5 forming the connector between the source of lighting energy 3—4 and the marker 2; these may be protected from the water by their own cover or enclosed in a flexible tube. As a whole, the connector 5 is made sufficiently flexible for the purpose as appears herein, and, as a precaution, is usually made as flexible as reasonably possible. The unit 2—5—4 is slightly buoyant as a whole. However the container 4 (with its battery 3) is made somewhat less than buoyant, and usually about as little less than buoyant as reasonably possible, the connector 5 may or may not be buoyant, and the marker 2 is given sufficient excess buoyancy to assure floating of the whole. Accordingly, the unit as a whole floats with the marker 2 substantially at the surface of the water and with the source-container 4 suspended from and below the marker. The connection 5 is of sufficient length to place container 4 below the draft of the hull or pontoon of any aircraft likely to use the landing field (and likewise it may be placed below the depth or draft of any surface craft using the same waters). The marker 2 may be relatively small, and of no great weight. If therefore the marker is struck by a landing plane, the marker is thrust aside or is submerged as indicated in broken lines in Fig. 2, the aircraft thus passing it, and this is accomplished with such little effort that the hull or pontoon of the plane striking it is not damaged even though the craft may be landing at a high speed. On the passing of the craft, the connector 5 straightens out again and the device resumes its original position by reason of its bouyancy.

As also illustrated in this Fig. 2, each marker-unit may be anchored individually as by anchor 6. The anchor chain 7 is of sufficient length to permit the assembly 2—5—4 to rise as required by the highest tides. By reason of the construction and assembly, the assembly responds substantially as a unit to not only the tides but to other disturbances of the water. If desired, the marker 2 may be so shaped that the water offers as little resistance as possible to the movement of the marker 2 to one side or downwardly below the surface; it may, for example, be somewhat pear-shaped as illustrated in the drawings. Also, if desired, a buffer of soft rubber or other yielding material or structure may be incorporated in or added externally to the marker to further reduce the chance of damage to the hull or float of an aircraft coming in contact with it; for example, a ring 8 of soft rubber can be attached to its outer surface.

Instead of the markers being anchored individually, they may be assembled and anchored in groups. Fig. 3 is illustrative. Such a group may form, for example, one or a part of one of the rows of markers in Fig. 1. In this Fig. 3 each marker 2, connection 5, source of energy 3 and container 4 for the latter, is like the corresponding part of Fig. 2. A number of such units are connected together by chains or cables 10, in whatever form or grouping may be desired; the source-containers 4 are well adapted for connection together by the chains or cables 10. In such an arrangement the marker units 2—5—4 may be given sufficient buoyancy to suspend the connecting chains or cables, or the connecting cables may be so constructed as to be more or less buoyant in themselves, or they may be provided with buoyant floats to more or less support them as referred to again in connection with Fig. 4. To fix the group in the desired position, suitable of the units may be anchored to the bottom, for example the end units of a line as indicated in this Fig. 3. To anchor such units I preferably chain or cable them (11) to anchored floats or buoyant objects 13. These may be held by their anchors 14 below the water surface and below the depth or draft of boats and aircraft hulls and pontoons, say at about the average level of the source-containers 4. If necessary or desired the floats 13 may be held against currents, tidal flows or other like disturbances by anchors 15 offset more or less in the proper direction or directions to secure the desired result. With such an arrangement, the markers of the group rise and fall more or less as a group under the effect of major disturbances, while the flexing of the chains or cables permits them to move about more or less individually under lesser disturbances. The action of each of these markers as it may be struck by a passing aircraft or boat is similar to the action described with reference to Fig. 2.

Instead of providing each marker 2 with its own individual primary source of illuminating energy, a single primary source of energy may be provided for a number or all of the members of a group. Fig. 4 illustrates one such arrangement, and also illustrates a representative arrangement wherein a primary source of energy for a number of markers is floated so that, to a considerable extent at least, it rises and falls with the markers. The common primary energy source can be floated at or from the surface in various ways as will be apparent. In the present instance the single primary source 18 of illuminating energy (which may be a storage battery, for example) is carried in a watertight container 19 and suspended from a float 20 at, say, the depth reached by the flexible connectors 5 of the individual markers 2. Electrical conductors 21, protected from the water by their coverings or by being enclosed in suitable tubes or cable structures, conduct the current to the lower end of each of the flexible connections 5, thus constituting the immediate source of illuminating energy of each marker. These conductors or their covers or wrappings may serve the purposes of the chains or cables 10 of Fig. 2 also, as indicated in this Fig. 4. As a whole, the conductor-structure 21 with any weights or floats 22 that may be added near the lower ends of the flexible connectors 5 is made less than buoyant, and is suspended through the flexible connectors 5, from and by the buoyancy of the markers 2, assisted possibly by some little buoyancy of the connectors 5; this retains the conductor-structure 21 in place below the reach of passing crafts. Preferably however the conductor-structure 21 is only a little less than buoyant so as to minimize the excess buoyancy required of the markers 2, and thereby permit these to be made as small and light as possible and thereby as little likely as possible to damage aircraft that may strike a marker. In so far as necessary or desirable, the conductors and/or connecting chains or cables 21 may be given added buoyancy by attaching floats or buoyant objects 23 to or along the same, and by the use of floatable objects at 22; if more negative buoyancy is required in any instance, some or all of 22 and 23 may be weights. The group of markers may be held in place substantially as before; an alternative construction is direct connection to anchors 24 at the two ends of the group or otherwise, as illustrated in this Fig. 4. The float 20 which supports the common source of energy 18—19 in this instance, may need to be so large that it might cause damage if struck by aircraft. To avoid such accidents a source-float (e. g. 18—19—20) may be located outside the area used by aircraft, such as beyond the end of a landing runway or at one side as outside the boundaries 1a of Fig. 1. The connection 25 by means of which the source 18—19 is suspended from its float 20 may be a conveniently flexible one so that the float 20 may be displaced if struck by surface craft. Inasmuch as the source-float (e. g. 18—19—20) rises and falls with water disturbances substantially along with the markers 2 and the connecting cables 21, flexing of the latter by water disturbances is minimized.

Instead of floating the primary source of energy for the illumination however, this primary source of energy may be located on the shore or in some other convenient fixed position. Fig. 5 illustrates such an arrangement wherein a transformer or engine-driven electrical generator is contained in a shelter 28 mounted on a pier 29 at the shore. The markers 2, placed wherever desired have as before flexible connections 5 connecting their lamps with electrical conductors carried in connecting cables 30, which may be substantially as those described with reference to Fig. 4. Adjacent the pier 29, a float 31 is provided. This rises and falls with the rise and fall of the surface of the water on which the markers 2 float, but otherwise is held substantially in fixed position by a bar 32 hinged to the pier 29 and also hinged to a member 33 attached to the float; this anchoring of the float 31 may be supplemented by chain or cable anchoring 34 or otherwise, if desired. The supply-cables 30 extend to the float; this cable may pass through the bottom of the float and be held straight down from it by a weight or other object 35 that is non-buoyant, extending thence to the marker-connectors 5. In effect, another conductor or other conductors 36 connect 30 to the primary source 28 of illuminating energy, and between 36 and 30 some sort of slip connection is provided, electrically connecting 36 to 30, but yielding, without destructive stresses, as the float 31 rises and falls with respect to the primary source 28. As shown in Fig. 6 for example, the upright 33 on the float may carry a pair of metallic rings or arcuate members 37 centered about the axis of the pin 38 by which the bar 32 is hinged to the upright 33, while the bar 32 carries a pair of brushes bearing on the rings 37 and accordingly sliding on these rings 37 as the float 31 rises and falls and the bar turns with respect to the upright; the rings 37 are connected to the two conductors of the cable 30 rising from the water, while the brushes 39 are connected to the two conductors of 36 which extend to the primary source 28. The marker system can rise and fall as a unit therefore, without flexing any conductor. As a whole the marker-connector-conductor system 2—5—30 can be anchored in place as before indicated or otherwise.

Various other arrangements can be devised for preventing or minimizing possible flexing of the connector between such a float as 31 and a source of energy 28 mounted in a fixed position. Fig. 7 illustrates another arrangement by way of example. In this Fig. 7 the connecting cable 30 and non-floating member 35 will be recognized. As before, a float 43 may be placed at the side of a pier 44 carrying a primary source 45 of illuminating energy to supply a group of markers arranged as in Fig. 5 for example. In the place of brushes and slip rings of Fig. 6 however, the portion of the conductor-cable 30 extending between the float 43 and source 45 is draped into a relatively large loop 46; this loop may be provided by passing the connector over a standard 47 rising from the float, and over another standard 48 rising from the pier. As the float 43 rises and falls, flexing of the conductor-cable 30 occurs within this loop, but because of the length of the loop each short length of the conductor-cable is flexed to only a small extent. By making the loop of sufficient length therefore, the effect of the flexing due to movement of the water may be minimized to any desired extent. Fig. 7 also illustrates another of the many various possible modes of anchoring such a float as 43; in this instance the suspended member 35 is chained to the anchor 50 at the foot of the pier.

In Fig. 8 the conductor-cable 30, between the fixed-location primary source of energy supply 60 supplying a number of markers, is also suspended above the bottom, and is led direct to the source 60, care being taken not to place it in contact with a surface that might abrade it. If necessary, a weight 61 can be used to sink the conductor-cable 30 below the surface at some desired distance away.

As before indicated, the lamps of the markers 2 may be placed substantially at the surface of the water, and such disposition may be preferable for markers arranged in guiding rows such as the rows 1 in Fig. 1. Conceivably the lamps may be placed below the surface. If desired however (for example, for markers in outlining or forming boundary lights as in rows 1a) the lamp of the marker may be placed some distance above the surface. An example is illustrated in Fig. 9. The marker may comprise a floating member 55 performing the floating functions of the devices 2 previously described. This may be shaped like those devices 2. Mounted on the float 55 is an upright standard 56 which may be of light weight and which carries a lamp that may be protected and surrounded by a guard or shield 57. The whole of such an arrangement being of light weight, it is readily thrust aside and run over by aircraft and without damage to the aircraft. If desired, the standard 56 can be elastically-yielding, so as to bend when its lamp is struck and resume its upright position again when the craft striking it has passed. The conductors for the lamp may be carried through the standard 56. In other respects, the marker arrangement may be as illustrated in the previous figures.

It will be understood of course that appropiate means may be provided for turning the lights on and off if desired; for example, switches where the lamps are lighted by electricity.

It will be understood also that my invention is not limited to the details of construction and operation illustrated in the accompanying drawings and described above, except as appears hereinafter in the claims.

I claim:

1. In a device for aircraft landing areas on water, a floatable illuminating marker, non-floatable means for supplying lighting energy to the illuminating marker, and flexible connecting means, readily yielding when the marker is struck and having a length greater than the draft of the aircraft, connecting said energy-supplying means to said marker and through which the marker is supplied with lighting energy and suspends said energy-supplying means at a depth greater than the draft of the aircraft.

2. The subject matter of claim 1, characterized by the fact that said energy-supplying means comprises a battery, and said battery is suspended by said connecting means from the marker.

3. For aircraft landing areas on water, the combination of a plurality of floatable illuminating markers, non-floatable means for supplying lighting energy to said illuminating markers, and flexible connecting means, readily yielding when the marker is struck and each having a length greater than the draft of aircraft, connecting said energy-supplying means to said markers and through which the markers are supplied with lighting energy and suspend said energy-supplying means at a depth greater than the draft of aircraft, characterized by the fact that means are provided, located below the draft of aircraft, to connect said flexible connecting means and thereby connect said markers together as a unitary group, and anchors are provided to hold said group of markers, as a unit, in an orderly predetermined relation.

4. For aircraft landing areas on water, the combination of a plurality of floatable illuminating markers, means for supplying lighting energy to said illuminating markers including a conductor cable and a primary source of energy connected to said cable, and flexible connecting means, readily yielding when a marker is struck and having a length greater than the draft of aircraft, connecting said cable to the markers and suspending the cable, whereby said cable is located out of the reach of aircraft and out of contact with the bottom.

5. The subject matter of claim 4, characterized by the fact that means are provided to float in the water, in a position below the draft of aircraft, said primary source of lighting energy, supplying lighting energy for all said markers.

6. The subject matter of claim 4, characterized by the fact that said primary source of lighting energy, supplying lighting energy for all said markers, is mounted in a fixed position, a float is provided on the water adjacent said fixed primary source, and means, supported through said float, connect the primary source to the conductor cable, said means being arranged to yield with the repeated movements of the float without imposing undue stress on said cable.

DONALD D. COOKE.